Patented Mar. 15, 1938

2,111,074

UNITED STATES PATENT OFFICE 2,111,074

DYESTUFFS AND INTERMEDIATES OF THE ANTHRAQUINONE SERIES

William H. Lycan, South Milwaukee, Wis., assignor to E. I. du Pont de Nemours & Company, Wilmington, Del., a corporation of Delaware No Drawing. Application November 22, 1935, Serial No. 51,078

5 Claims. (Cl. 260—37)

This invention relates to the preparation of new compounds of the anthraquinone-2,1(N)-benzacridone series, which are useful as dyestuffs and are valuable intermediates for the preparation of other dyestuffs.

It is known that halogen benzanthrones which carry the halogen in either one of the peri-positions can be condensed with amino-anthraquinones and that the resulting products, on further treatment with acid or alkaline condensing agents, give dyestuffs.

I have found that new and valuable compounds can be prepared by condensing halogen benzanthrones, which contain a halogen in one of the peri-positions, with alpha-amino-anthraquinone-2,1(N)-benzacridones and that the resulting compounds, even prior to further treatment with acid or alkaline condensing agents, have valuable dyestuff properties. These imide compounds may also be converted to dyestuffs having different properties by further treatment with acid or alkaline condensing agents.

According to my invention, an alpha-amino- (or halogen) anthraquinone-2,1(N)-benzacridone is condensed with a 2- or Bz-1-halogen- (or amino) benzanthrone, respectively, by the procedure normally used for the preparation of anthrimides (di-anthraquinonyl imides), for example, by heating in an inert solvent such as naphthalene, or nitrobenzene, in the presence of an acid binding agent and a copper catalyst. Where dihalogen compounds such as 6,Bz-1-dibromo-benzanthrone are used, two moles of the amino-anthraquinone-benzacridone may be combined therewith.

The products are, in general, dark brown to block powders soluble in sulfuric acid yielding olive brown to brown to violet solutions. They are soluble in alkaline hydrosulfite forming violet to violet black vats from which cotton is dyed in weak violet to bordeaux to orange shades.

The following examples are given to more fully illustrate my invention. The parts used are by weight.

Example I

A reaction mixture is prepared by introducing 34 parts of 5-amino-anthraquinone-2,1(N)-benzacridone and 32 parts of Bz-1-bromo-benzanthrone into 450 parts of molten naphthalene. The suspension is stirred with a copper blade agitator and there are added 25 parts of anhydrous sodium acetate and 0.4 part of copper acetate. The resulting melt is heated to the reflux temperature and held thus until the reaction is complete. This usually requires from 6 to 20 hours. It is then cooled to 180° C. and diluted by the addition of 450 parts of ortho-dichloro-benzene. After cooling further, the suspension is filtered at 50–60° C. and the residue is washed with an additional 200 parts of ortho-dichloro-benzene in portions. The residual solvent is removed by steam distillation of the filtered product after which it is again filtered and inorganic salts removed by washing with hot water.

When dried, the product is obtained as a dark brown powder which yields clear brown solutions in sulfuric acid. The addition of small quantities of formaldehyde to the sulfuric acid solution causes it to turn rapidly to a dark green solution. The product is soluble in alkaline hydrosulfite yielding a violet colored vat from which cotton is dyed in weak violet shades.

An identical product is obtained when 5-chloro-anthraquinone-2,1(N)-benzacridone is condensed under similar conditions with a molecular proportion of Bz-1-amino-benzanthrone.

Example II

A suspension is prepared by introducing 34 parts of 8-amino-anthraquinone-2,1(A)-benzacridone and 32 parts of Bz-1-bromo-benzanthrone into 500 parts of nitrobenzol under agitation. There are added 15 parts of anhydrous sodium carbonate and 0.4 part of cuprous chloride. This reaction mass is heated at 207° C. during a period of 15 hours. It is then cooled to room temperature and is filtered. The residue is freed from the remaining solvent by distillation with steam and is isolated by filtration and washing with hot water.

When dried, the product is a dark brown powder closely resembling that of Example I. It yields a brown solution in sulfuric acid which turns green upon addition of a small amount of formaldehyde. It dyes cotton in weak violet shades from a violet alkaline hydrosulfite vat.

Example III

A melt is prepared by heating 450 parts of naphthalene to 120° C. under agitation with a copper blade agitator. There are added 34 parts of 8-amino-anthraquinone-2,1(N)-benzacridone, 30 parts of Bz-1-chloro-benzanthrone, 20 parts of anhydrous sodium acetate and 0.5 part of copper acetate. This melt is heated at 215° C. for a period of 15 hours. It is then cooled to 180° C. and is diluted by the addition of 500 parts of ortho-dichloro-benzene. The resulting suspension is filtered at 50–60° C. and the residue is washed with an additional 200 parts of ortho-dichloro-benzene in portions. The product is isolated in the usual manner and is identical in every respect with that of Example II.

Example IV

A melt is prepared by suspending 34 parts of 4-amino-anthraquinone-2,1(N)-benzacridone and 32 parts of Bz-1-bromo-benzanthrone in 450 parts of molten naphthalene using a copper blade agitator. There are added 25 parts of anhydrous sodium acetate and 0.4 part of copper acetate. This mixture is heated during a period of 20 hours at 213–215° C. It is then cooled to 150° C. and is diluted by the addition of 500 parts of solvent naphtha. The charge is filtered at 50° C. and the residue is washed free from naphthalene with solvent naphtha. The residual solvent naphtha is washed out with alcohol and inorganic salts are removed by washing repeatedly with hot water.

When dried, the product is obtained as a black powder resembling the product of Example I in properties. It yields a brownish olive solution in sulfuric acid which turns green upon addition of formaldehyde. It dyes cotton in weak violet gray shades from a violet alkaline hydrosulfite vat.

Example V

A melt is prepared consisting of 39 parts of a mixture of 5-amino- and 8-amino-anthraquinone-2,1(N)-benzacridone (prepared from a mixture of approximately equal parts of 1-chloro-5-amino- and 1-chloro-8-amino-anthraquinones) and 37 parts of Bz-1-bromo-benzanthrone in 500 parts of molten naphthalene. The melt is stirred with a copper blade agitator and there are added 25 parts of anhydrous sodium acetate and 0.5 part of copper acetate. It is then heated to the reflux temperature and is held thereat during a period of 22 hours. When the reaction has thus been completed, the melt is cooled to 170° C. and is diluted by the addition of 600 parts of ortho-dichloro-benzene. The product is isolated in a manner entirely similar to that of Example I.

There is thus obtained a mixture of approximately equal parts of the products described in Examples I and II.

Example VI

A suspension of 10 parts of anhydrous sodium acetate and 0.4 part of copper acetate in 250 parts of molten naphthalene is prepared. This melt is stirred at 150° C. with a copper blade agitator and there are added 17.5 parts of 5-amino-anthraquinone-2,1(N)-benzacridone and 10 parts of 6,Bz-1-dibromo-benzanthrone. The resulting reaction mixture is heated at 213–215° C. during a period of 25 hours. It is then cooled, diluted with solvent naphtha, and the product is isolated exactly as described in Example IV.

It is thus obtained, when dry, as a dark brown powder which yields pure brown solutions in sulfuric acid. The addition of small amounts of formaldehyde causes these solutions to turn green. The product yields a blue violet alkaline hydrosulfite vat from which cotton is dyed in rather heavy bordeaux shades.

Example VII

There are introduced into 250 parts of nitrobenzol under agitation, using a copper blade agitator, 15 parts of 4,3',4'-trichloro-anthraquinone-2,1(N)-benzacridone, 10 parts of Bz-1-amino-benzanthrone, 8 parts of soda ash and 0.4 part of cuprous chloride. The resulting mixture is heated at the reflux temperature during a period of 15 hours. It is then allowed to cool and the product is isolated in a manner exactly similar to that described in Example II.

The product, when dry, is a dark brown powder which dissolves in sulfuric acid to yield a dull violet solution. It is soluble in alkaline hydrosulfite to form a violet vat from which cotton is dyed in weak reddish-gray shades.

Example VIII

A melt is prepared by heating 90 parts of naphthalene to 140° C. and adding 4 parts of anhydrous sodium acetate and 0.1 part of anhydrous copper acetate. There are added to this melt 7.4 parts of 5-amino-anthraquinone-2,1(N)-benzacridone and 5 parts of 2-chloro-benzanthrone. This mixture is stirred for 20 hours at the reflux temperature using a copper blade agitator. It is then cooled to 160° C. and is diluted by the addition of 150 parts of solvent naphtha. The product is filtered at 50° C. and is washed free from naphthalene with fresh solvent naphtha. The residual solvent is removed by washing with alcohol and inorganic salts are removed by washing thoroughly with hot water.

The product, when dry, is a deep brown powder. It gives a violet solution in concentrated sulfuric acid which turns green upon addition of a small amount of formaldehyde. It dyes cotton in reddish-orange shades from a blue-violet alkaline hydrosulfite vat.

A very similar product is obtained by condensing molecular proportions of 8-amino-anthraquinone-2,1(N)-benzacridone and 2-chloro-benzanthrone under identical conditions. The product is somewhat weaker tinctorially but is otherwise very similar in properties.

The benzanthrone-anthraquinone-2,1(N)-benzacridone imides prepared according to this invention may be converted to more valuable dyestuffs by treatment with acid or alkaline condensing agents. In my copending application, Serial No. 51,079, which has matured into Patent 2,081,874, granted May 25, 1937, the treatment of these compounds with alkaline condensing agents is described. In general, they may be heated with alcoholic potash, caustic potash in aniline, sodium anilide in aniline, or alkali metal alcoholates in aniline, at temperatures of from about 100° C. to about 180° C. until condensation is completed. The resulting dyestuff may be isolated and further treated with sulfuric acid to give products which dye cotton from violet colored hydrosulfite vats in gray to black shades of good fastness properties.

The imide dyestuffs of the above examples may also be treated with acid condensing agents. The following examples are given to illustrate the use of various acid condensing agents.

Example IX 25 parts of the product of Example I are introduced at 125–130° C. into a melt consisting of 150 parts of aluminum chloride and 30 parts of salt. The resulting solution is agitated at 135–140° C. for 90 minutes, after which it is cooled slightly and is drowned in water. The product is filtered and washed free from acid with hot water. There is obtained, when dry, a bronze black powder which yields brown solutions in 96% sulfuric acid. The color of the sulfuric acid solution becomes only slightly greener upon addition of formaldehyde. The product is soluble in alkaline hydrosulfite to form a violet black vat from which cotton is dyed in reddish bordeaux shades.

*Example X*

5 parts of the product of Example II and 20 parts of powdered aluminum chloride are added to 100 parts of nitrobenzol under agitation. The resulting suspension is heated gradually to 140° C. and is held for 1 hour at 140–145° C. The solvent is removed by steam distillation. The product is filtered, washed acid free and dried. It is obtained as a violet black powder yielding wine colored solutions in 96% sulfuric acid. It yields a violet black alkaline hydrosulfite vat from which cotton is dyed in bluish bordeaux shades.

*Example XI*

10 parts of the product of Example V are introduced at 100–110° C. into a melt composed of 50 parts of aluminum chloride and 100 parts of pyridine. The temperature is raised very gradually during the course of 1½–2 hours to 160° C. The solution is then cooled slightly and is diluted in a large excess of water. The precipitated dyestuff is filtered and thoroughly washed. It is obtained, when dry, as a violet black powder soluble in 96% sulfuric acid to a reddish brown solution. It dyes cotton in violet gray shades from a violet black alkaline hydrosulfite vat.

*Example XII*

10 parts of the product of Example VI and 25 parts of aluminum chloride are suspended in 100 parts of nitrobenzol. The solution is heated very gradually to 170° C. during a period of 2 hours. It is then cooled and the nitrobenzol is removed by steam distillation. The product, when isolated in the usual manner, is a violet black powder soluble in 96% sulfuric acid to a deep red brown soluble. It dyes cotton in dull blue violet shades from a violet black alkaline hydrosulfite vat.

*Example XIII*

5 parts of the product of Example VII are introduced into a suspension composed of 20 parts of powdered aluminum chloride in 100 parts of nitrobenzol. This solution is heated to 100–110° C. and is held within these limits for 2 hours. The nitrobenzol is then steam distilled and the product is isolated in the usual manner. It is a violet black powder yielding rich reddish brown solutions in 96% sulfuric acid. It dyes cotton in dull blue violet shades from a deep blue violet alkaline hydrosulfite vat.

The condensation of the benzanthrone compound and the anthraquinone-benzacridone compound to form the imides may be carried out in other solvents than those specifically mentioned in the examples, such as, for instance, diphenyl, diphenyl oxide, trichlorobenzene, etc., although the use of nitrobenzene or naphthalene is preferred.

Other acid binding agents than those specifically mentioned, such as potassium carbonate, potassium acetate, sodium formate, etc. may be used. Copper carbonate and copper sulfate may be substituted for the cuprous chloride and copper acetate found in the specific examples. The temperatures used may vary within wide limits and are usually determined by the boiling point of the particular solvent. Temperatures of from 150 to about 225° C. are preferred. The product may be isolated in any desired manner, such as by direct filtration of the reaction mass, by dilution of the low-boiling solvent and filtration or by steam distillation.

I claim:
1. As new compounds benzanthrone-anthraquinone-2-1(N)-benzacridone imides, wherein the imide linkage is between one of the peri-positions of the benzanthrone nucleus and an alpha-position of the anthraquinone nucleus.
2. Bz-1-benzanthronyl-alpha-anthraquinone-2-1(N)-benzacridone imide.
3. Bz-1-benzanthronyl-5-anthraquinone-2-1(N)-benzacridone imide.
4. Bz-1-benzanthronyl-8-anthraquinone-2-1(N)-benzacridone imide.
5. A substituted Bz-1-benzanthronyl-5-anthraquinone-2-1(N)-benzacridone imide of the formula:

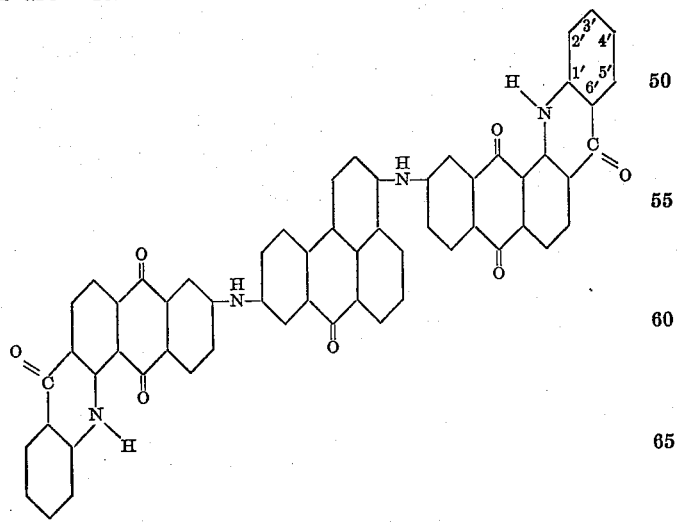

WILLIAM H. LYCAN.

Certificate of Correction

Patent No. 2,111,074.                                       March 15, 1938.

WILLIAM H. LYCAN

It is hereby certified that errors appear in the printed specification of the above numbered patent requiring correction as follows: Page 1, first column, line 37, for the word "block" read *black*; and second column, line 27, for "8-amino-anthraquinone-2,1(A)-benz-" read *8-amino-anthraquinone-2,1(N)-benz-*; page 3, second column, lines 47 to 68, inclusive, claim 5, strike out the formula and insert instead the following:

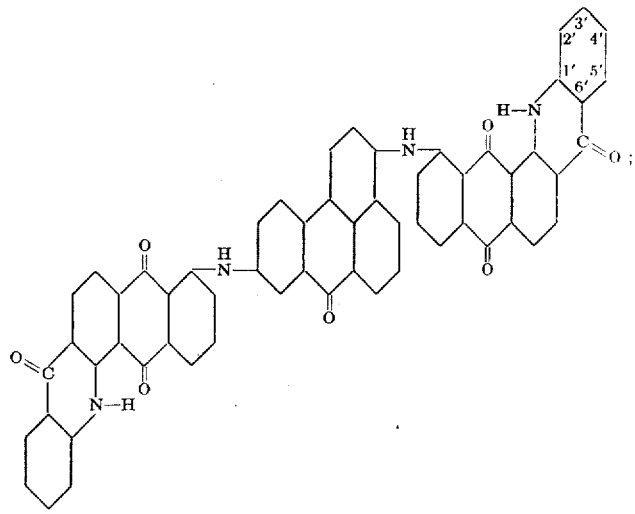

and that the said Letters Patent should be read with these corrections therein that the same may conform to the record of the case in the Patent Office.

Signed and sealed this 31st day of May, A. D. 1938.

[SEAL]

HENRY VAN ARSDALE,
*Acting Commissioner of Patents.*